United States Patent [19]

Hood, Jr. et al.

[11] Patent Number: 5,706,256
[45] Date of Patent: Jan. 6, 1998

[54] CLOCK FREQUENCY COORDINATION FOR ELECTROMAGNETIC COMPATIBILITY

[75] Inventors: Rush W. Hood, Jr., Tampa; Michael B. Duich, Palm Harbor, both of Fla.

[73] Assignee: Johnson & Johnson Medical Inc., Tampa, Fla.

[21] Appl. No.: 577,140

[22] Filed: Dec. 22, 1995

[51] Int. Cl.⁶ .............. G04B 47/00; H03L 7/00; G01R 23/00
[52] U.S. Cl. .............. 368/10; 368/156; 331/2; 331/44; 331/46; 364/484; 364/571.01
[58] Field of Search ............. 368/10, 155, 156, 368/200–202; 331/2, 44–46; 364/484–485, 571.01

[56] References Cited

U.S. PATENT DOCUMENTS

| | | | |
|---|---|---|---|
| 3,921,079 | 11/1975 | Heffner et al. | |
| 4,407,589 | 10/1983 | Davidson et al. | 368/201 |
| 4,953,148 | 8/1990 | Ledek et al. | 368/202 |
| 5,317,601 | 5/1994 | Riordan et al. | 375/107 |
| 5,357,491 | 10/1994 | Yamasaki | 368/156 |

*Primary Examiner*—Vit W. Miska
*Attorney, Agent, or Firm*—Woodcock Washburn Kurtz Mackiewicz & Norris LLP

[57] ABSTRACT

A method for selecting fundamental clock frequencies in order to achieve electromagnetic compatibility in electronic products which employ a plurality of clocks. The method require first selecting an ideal frequency for each clock in the product. Then, and until the goal of avoiding coinciding harmonics is complete, the method includes the steps of computing all harmonics of all clock frequencies chosen, determining a minimum difference tolerable in the chosen frequencies and their harmonics for sufficient minimization of electromagnetic interference, and determining if the harmonics of the chosen frequencies coincide impermissibly within the frequency range. If there exists coincidence of harmonics within the predetermined minimum range, then the fundamental frequency of at least one of the clocks corresponding to an interfering harmonic must be adjusted to eliminate the interference. With the altered fundamental frequency, the steps of computing harmonics, determining if coincidence occurs, and adjusting the fundamental frequency is repeated.

3 Claims, 2 Drawing Sheets

CLOCK FREQUENCY COORDINATOR APPARATUS

CLOCK FREQUENCY COORDINATOR APPARATUS

CLOCK FREQUENCY COORDINATION FOR ELECTROMAGNETIC COMPATIBILITY

FIELD OF THE INVENTION

The present invention relates to a method of and apparatus for selecting fundamental clock frequencies used in physiologic monitors and other electronic devices in order to minimize the coincidence of harmonics of the frequencies throughout the frequency range of the radiated emissions investigation.

BACKGROUND OF THE INVENTION

In electronic products which employ a plurality of clocks, the coincidence of clock frequency harmonics may result in electromagnetic incompatibility as a result of electromagnetic interference. It is, therefore, desirable to reduce or eliminate the coincidence of the various clock frequency harmonics in order to minimize electromagnetic interference and to comply with functional specifications. However, the fundamental frequencies of the clocks must not be altered so dramatically as to affect the primary function of the clocks within the electronic product. The fundamental frequencies of the various clocks are set according to the timing function each clock has within the electronic product. For example, in physiologic monitors, the various clocks within the product are used for timing the vital signs or biological functions being monitored.

When harmonics of more than one clock coincide within a specified frequency range, the electromagnetic interference which is likely to result may lead to inaccurate measurements being taken or significant flaws in the information and statistics maintained and recorded by the electronic device. It is thus desired to minimize or eliminate the harmonic coincidence within a predetermined frequency range of operation and to thereby improve electromagnetic compatibility without impermissibly altering the fundamental frequencies of the various clocks so that they can no longer perform their designated functions.

SUMMARY OF THE INVENTION

The present invention relates to a method of selecting the fundamental clock frequencies for a plurality of clocks used in an electronic product in order to minimize the coincidence of harmonics within a designated frequency range. Such a method in accordance with the invention preferably comprises the following steps:

First, the ideal fundamental frequency for each of the plurality of clocks is chosen based on the primary function of the clocks within the electronic product. Once these ideal frequencies are selected, the coincidence of harmonics must be determined and minimized if it is determined that coincidence exists within a specific frequency range.

In order to determine the incidence of conflict of harmonics, the second step is to compute the harmonics of all of the ideal fundamental frequencies of the clocks within the electronic product.

Third, the user or manufacturer must determine the minimum frequency difference permissible between the ideal frequencies of the clocks and among all of the harmonics generated. The sensitivity of the product to the detrimental effects of electromagnetic interference will help in choosing the frequency difference required to avoid these detrimental effects to the application of the product.

Once this difference has been determined, each harmonic is compared with the harmonics of the other fundamental frequencies to determine if the frequency difference in each case is less than the minimum frequency difference selected. If no conflict exists, the electronic product should not suffer from electromagnetic interference and the clock frequencies should remain unchanged. If, however, some of the harmonics do coincide within the frequency range, the fundamental frequency of at least one of the clocks must be modified to avoid the detrimental effects of electromagnetic interference.

To minimize or eliminate the detrimental electromagnetic interference, the user or manufacturer of the electronic product must adjust within a narrow range the fundamental frequency of the clock corresponding to the conflicting harmonic. With the modified fundamental frequency, the steps of computing harmonics and determining if any of the harmonics fall within the selected minimum frequency difference must be repeated. Until the harmonics do not coincide within the range of radiated emissions investigation, the method requires repeating these same steps while continuing to adjust the fundamental frequency of the clock with the offending harmonic. Once no harmonics coincide within that range, the fundamental frequencies of the clocks used in the product are properly set to avoid problems with electromagnetic interference.

The present invention also discloses an apparatus for implementing the above described method. The apparatus, a clock frequency coordinator, receives user inputs specifying the ideal fundamental frequency for each clock within an electronic product and the minimum frequency difference required between the harmonics of these fundamental frequencies in order to achieve sufficient electromagnetic compatibility for the electronic product to operate within functional specifications. The processor of the clock frequency coordinator then uses these inputs in performing the method described above, as implemented by the processor through software. Then, when the values for the fundamental frequencies of the clocks have been determined by the method above, the fundamental frequencies of the clocks are set according to the values so computed.

BRIEF DESCRIPTION OF THE DRAWINGS

The present invention will be better understood after reading the following detailed description of the presently preferred embodiments thereof with reference to the appended drawings, in which.

DETAILED DESCRIPTION OF THE PREFERRED EMBODIMENT

Figure 1:
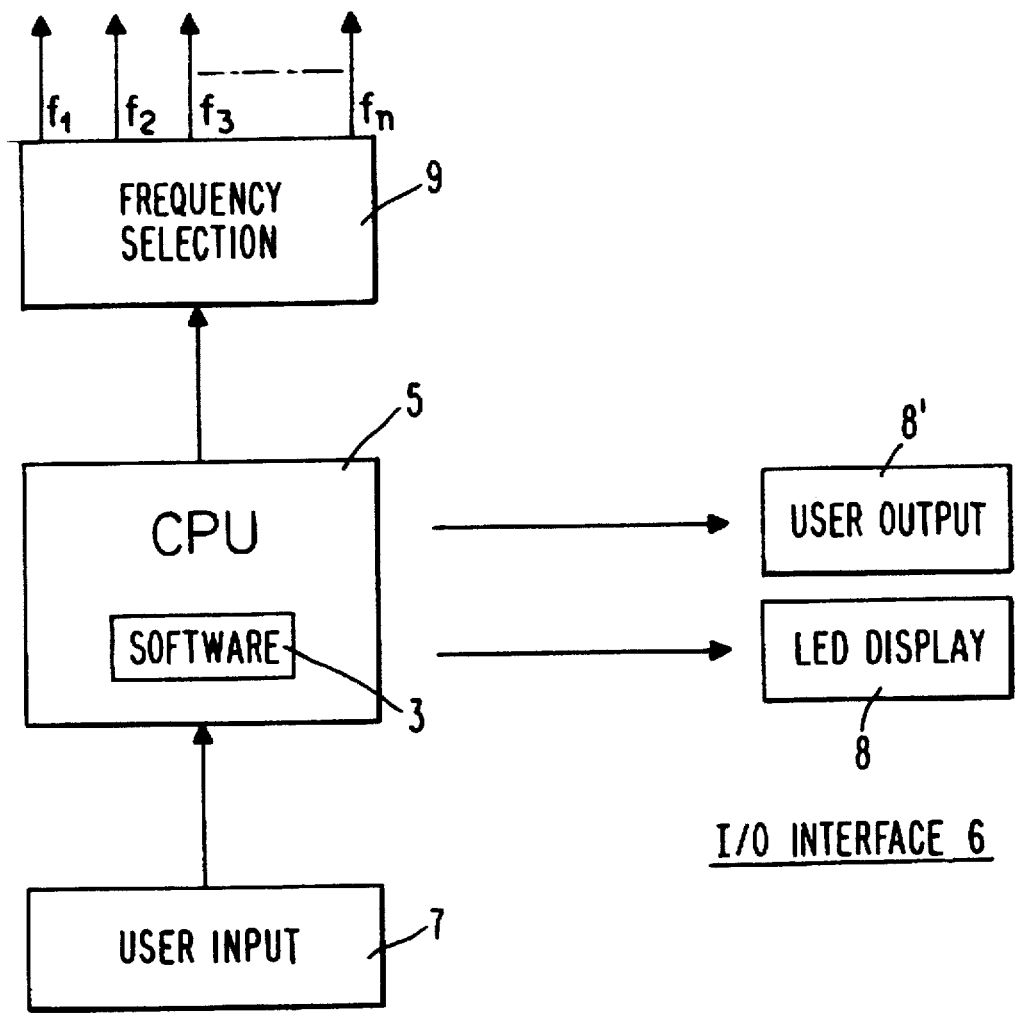
FIG. 1 discloses the preferred embodiment of the clock frequency coordinator which implements the method of the present invention.
Figure 2:
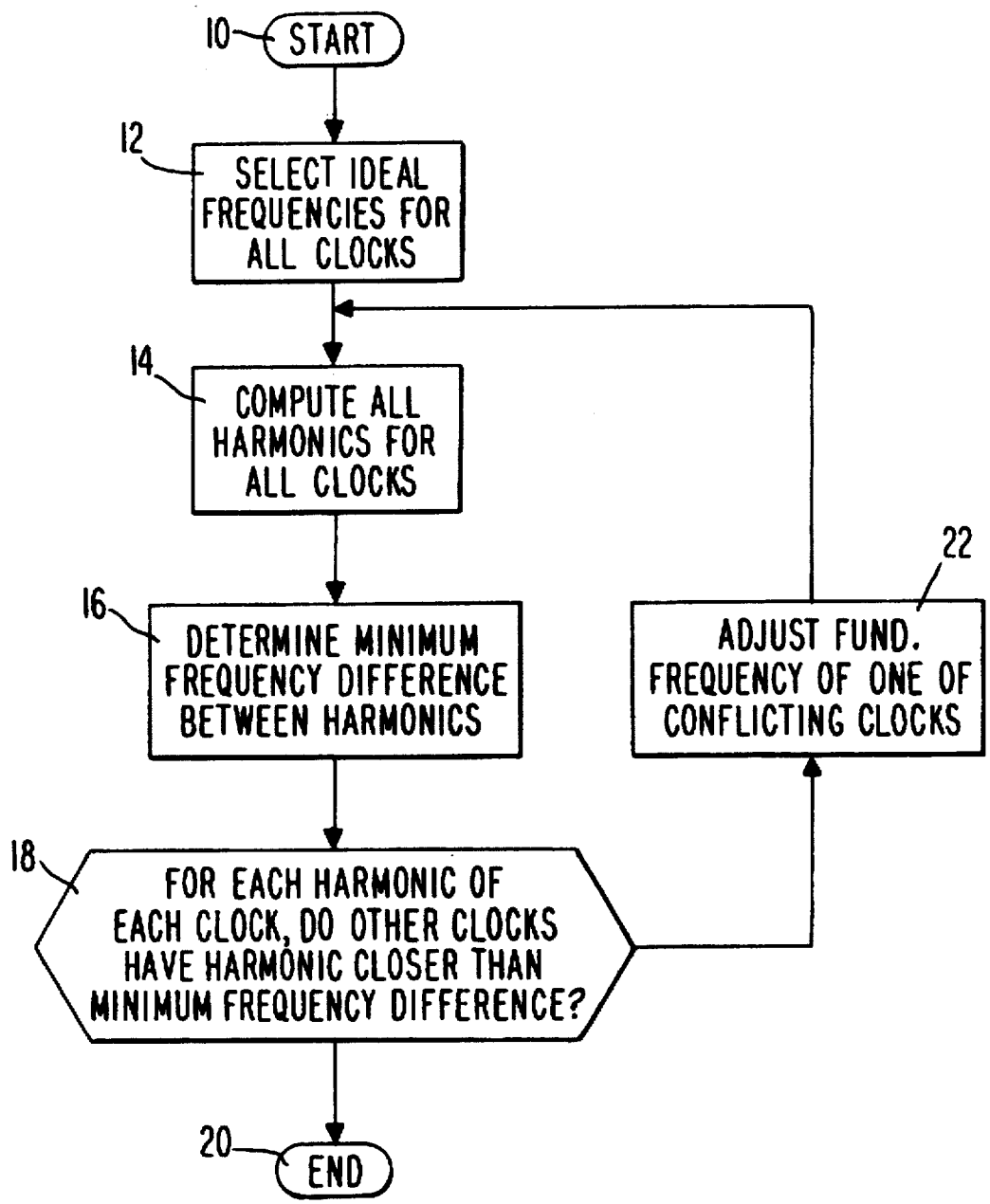
FIG. 2 provides a flowchart describing the steps necessary to carry out the method of the present invention.

FIGS. 1 and 2 illustrate the preferred embodiments of the apparatus and method for clock frequency coordination according to the present invention. It is to be understood that the embodiments disclosed are illustrative only, and the invention is by no means limited to that disclosed except as set forth in the appended claims.

FIG. 1 illustrates a preferred embodiment of a clock frequency coordinator 1 which automatically performs the method for clock frequency coordination described in the flowchart of FIG. 2. In the illustrated embodiment of FIG. 1, the method of the invention is implemented in software 3 operating on a central processing unit 5. The central processing unit 5 also contains an I/O interface 6 which allows entry of user input 7 required by the method, including the ideal fundamental frequency for each of the clocks within the electronic product and the minimum frequency difference required between the harmonics of all the clock frequencies in order to achieve electromagnetic compatibility. With this information, the central processing unit 5 runs the software 3 and computes the proper fundamental frequencies, $f_1, f_2, f_3, \ldots f_n$, for each of the clocks within the electronic product. Once the proper values for the fundamental frequencies, $f_1, f_2, f_3, \ldots f_n$, of each of the clocks has been derived, the central processing unit 5 displays these values through an LED Display 8 or other form of user output 8' again through the I/O interface 6. Alternatively, a selection input may be provided to a frequency selection circuit 9 for selecting the proper fundamental frequencies, $f_1, f_2, f_3, \ldots f_n$, for application in the product.

The flowchart in FIG. 2 illustrates the essential steps to the method of the present invention. As noted above, the flowchart of FIG. 2 is preferably implemented as software 3 on the central processing unit 5 of FIG. 1. As shown, the method starts at step 10 and first chooses the ideal frequencies for all clocks utilized in one electronic product at step 12. These frequencies are determined primarily by the function to be performed by each of the clocks within the product.

Once the ideal frequencies are selected at step 12, the coincidence of harmonics of these clock frequencies must be determined. In order to achieve this, the present invention automatically computes all harmonics for all clocks within the electronic product at step 14. Then, to determine if electromagnetic interference from the coincidence of harmonics within the electronic product will unduly impair the operation of the electronic product, the method requires that the minimum frequency difference between harmonics be determined at step 16 in order to alleviate the detrimental affects of the electromagnetic interference. This frequency difference is dependent on the sensitivity of the product to the undue affect of electromagnetic interference and the precision required in the operation of the product, as well as the governmental limitations on electromagnetic interference emissions during operation of the product.

Upon determination of the minimum frequency difference required between the harmonics for the accurate functioning of the product at step 16, it is automatically determined at step 18, for each harmonic of each clock, if other clocks have harmonics closer than the minimum frequency difference selected at step 16. If no two harmonics coincide within the frequency range of interest, then the fundamental frequencies of the clocks are properly set and the method of the present invention is exited at step 20.

If, however, some harmonics are closer to each other than the minimum frequency difference selected, the fundamental frequency of one of the conflicting clocks must be adjusted at step 22. By slightly adjusting the fundamental frequency of one of the clocks whose harmonic coincides with the harmonic of another clock within the frequency range, the difference in the harmonics will be significantly greater, as the change in the harmonic's frequency is defined by the change of the fundamental frequency multiplied by the harmonic number. Therefore, relatively small variations from the ideal fundamental frequency of the clocks in an electronic product can result in substantial benefits in reducing electromagnetic interference from harmonics coinciding within the range of radiated emissions investigation.

After the fundamental frequency of one of the conflicting clocks has been adjusted at step 22, steps 14, 16 and 18 are repeated for the adjusted frequency. As long as harmonics appear closer than the minimum frequency difference required for the system, the fundamental frequency of the clocks will be adjusted and these steps will be repeated. Once no coincidence within the range is detected, the fundamental frequencies of the clocks are properly set and the method is exited at step 20.

It will be appreciated by those skilled in the art that the foregoing has set forth the presently preferred embodiment of the invention and illustrative embodiments of the invention but that numerous alternative embodiments are possible without departing from the novel teachings of the invention. Accordingly, all such modifications are intended to be included within the scope of the appended claims.

We claim:

1. A method of selecting the fundamental clock frequencies of a plurality of clocks to be used in an electronic product so as to minimize the coincidence of harmonics of said plurality of clocks in a frequency range of interest, comprising the steps of:

(a) selecting an ideal fundamental frequency for each of said plurality of clocks;

(b) computing all harmonics in said frequency range of interest for each of said plurality of clocks;

(c) determining a minimum frequency difference permitted between each of said fundamental frequencies and each of said harmonics of said plurality of clocks;

(d) for each harmonic computed in said computing step (b), determining which other of said plurality of clocks has a harmonic which has a frequency difference with said each harmonic which is less than said minimum frequency difference;

(e) adjusting the fundamental frequency of the clock corresponding to said each harmonic in step (d) for which a harmonic of another clock is found in step (d) to have a frequency difference with said each harmonic which is less than said minimum frequency difference; and (f) repeating steps (b) through (e) for said plurality of clocks, including any clock whose fundamental frequency is adjusted in step (e), until it is determined in step (d) that none of said plurality of clocks has a harmonic which has a frequency difference with a harmonic of any other of said plurality of clocks which is less than said minimum frequency difference.

2. A clock frequency coordinator for selecting the fundamental clock frequencies for all clocks to be used in an electronic product, so as to minimize the coincidence of harmonics of said clocks in a frequency range of operation of said electronic product, comprising:

a means for inputting ideal fundamental frequencies for each of said clocks and minimum acceptable frequency difference between each of said fundamental frequencies and each harmonic of said fundamental frequencies in said frequency range of operation;

a processor for selecting the fundamental clock frequencies for said clocks by performing the steps of:

(a) computing all harmonics in said frequency range of operation for each of said clocks;

(b) for each harmonic computed in said computing step (a), determining which other of said clocks has a harmonic which has a frequency difference with said each harmonic which is less than said minimum acceptable frequency difference;

(c) adjusting the fundamental frequency of the clock corresponding to said each harmonic in step (b) for which a harmonic of another clock is found in step (b) to have a frequency difference with said each harmonic which is less than said minimum acceptable frequency difference; and (d) repeating steps (a) through (c) for said clocks, including any clock whose fundamental frequency is adjusted in step (c), until it is determined in step (b) that none of said clocks has a harmonic which has a frequency difference with a harmonic of any other of said clocks which is less than said minimum acceptable frequency difference; and means for displaying the selected fundamental clock frequencies to a user.

3. The clock frequency coordinator of claim 2, wherein said processor outputs a clock selection signal and said clock frequency coordinator further comprises means, responsive to said clock selection signal, for automatically selecting the fundamental clock frequencies for said clocks from a plurality of available fundamental clock frequencies.

* * * * *